United States Patent [19]
Forsythe et al.

[11] 3,844,863
[45] Oct. 29, 1974

[54] REPAIR OF WOODEN ARTICLES

[75] Inventors: David M. Forsythe, Clackamas; William J. Runckel, Portland, both of Oreg.

[73] Assignee: Publishers Paper Co., Oregon City, Oreg.

[22] Filed: May 16, 1973

[21] Appl. No.: 360,810

Related U.S. Application Data

[63] Continuation-in-part of Ser. No. 61,769, Aug. 6, 1970, Pat. No. 3,741,853.

[52] U.S. Cl............... 156/98, 117/2 R, 144/310 B, 264/36
[51] Int. Cl............................................ B32b 35/00
[58] Field of Search ......... 264/36; 117/2 R; 156/94, 156/98; 260/9, 17.2; 144/310 R, 310 B

[56] References Cited
UNITED STATES PATENTS

| | | | |
|---|---|---|---|
| 2,773,847 | 12/1956 | Pauley | 260/17.2 |
| 3,200,030 | 8/1965 | Oita | 156/94 X |

*Primary Examiner*—Edward G. Whitby
*Attorney, Agent, or Firm*—Kolisch, Hartwell, Dickinson & Stuart

[57] ABSTRACT

A method of repairing a wooden article having an aperture or hole therein such as a knothole, or the result of routing out a defect in the article. The aperture is filled with a filler composition having a flowable liquid consistency, and which is a mixture of cork particles and resin. Because of the consistency of the filler composition, it flows out through gravity completely to fill the peripheral boundaries of the aperture. Through buoyancy, the cork particles tend to stratify in the repaired region prior to hardening of the filler composition. The cork, being a closed cell material, does not absorb the resin. On hardening, a filler plug is formed having a machinability and other characteristics closely matching that of natural wood.

5 Claims, 3 Drawing Figures

PATENTED OCT 29 1974 3,844,863

REPAIR OF WOODEN ARTICLES

This application is a continuation in part of prior-filed application Ser. No. 61,769, now U.S. Pat. No. 3,741,853 entitled "Repair of Wood Panels."

This invention relates to the repair of wooden articles, and more particularly to a novel method of repairing said articles utilizing a filler composition of flowable liquid consistency which on hardening produces a repaired region having machinability and other characteristics closely matching that of wood.

In the repair of an imperfection in a wooden article, several approaches have been used in the past. For instance, patching has been performed which comprises cutting out the defective area and substituting a patch of equal size cut from nondefective wood. Because of differences in shrinkage characteristics, grain structure, etc. such patching cannot be performed with permanent concealment as to where the repair took place. In another repair procedure, the imperfect area after being removed from the wood is filled with a filler, which may take the form of a hardenable resin. Several problems have attended this method of repair. Thus, when pure resin is utilized as a filler, when such hardens it does not have the machinability, or other characteristics such as stainability and reflectance, as the wood which surrounds the repaired area. As a consequence, the filled area or region tends to stand out from the remainder of the article containing the repaired region. Another problem of using a filler comprising essentially resin is one of expense.

Filler compositions in the form of paste-like mixtures of resin and sawdust may be less expensive. However, frequently a reaction occurs between the sawdust and the resin causing an objectionable color change in the final repaired area. Furthermore, sawdust is an open cell material, and thus wood particles quickly become saturated with resin when incorporated in the resin. As a result, a region filled with such a mixture is subject to many of the same problems as one filled with pure resin, i.e., a fill results which is difficult to stain, which has a sheen different from surrounding regions, which is difficult to machine as by sanding,etc. Other drawbacks include the fact that wood particles in the usual mix have a variety of different shapes, and these tend to orient differently in the filled region to produce differences in so-called strike and build, when coating materials are applied later. Additionally, when a putty-like material is applied, there is the requirement that such be puddled or worked into the region filled, and with any such working there is a tendency for the putty material to pull away from the edges of the aperture filled, resulting in a crevice which cannot be concealed with subsequent painting.

A general object of this invention is to provide a novel method for repairing a wooden article, to fill a hole or aperture therein, featuring the use of a liquid filler composition of flowable consistency which is readily introduced into the region to be repaired to fill such region without working as with a putty mixture.

Another object is to provide such a process wherein the filler composition comprises, in addition to a resin, a significant amount of cork particles which tend in the completed repaired area to concentrate adjacent the surface of the repaired region. Cork, being a closed-cell material, does not absorb resin as does sawdust. The particles impart machinability, reflectance and other characteristics closely resembling characteristics found in wood to the repaired region. In an article repaired with the process contemplated, the resin in the mixture produces a good seal with the bottom and sides of the cavity containing the filler composition.

These and other objects and advantages will become more fully apparent as the invention is described below in conjunction with the accompanying drawings, wherein.

Figure 1:
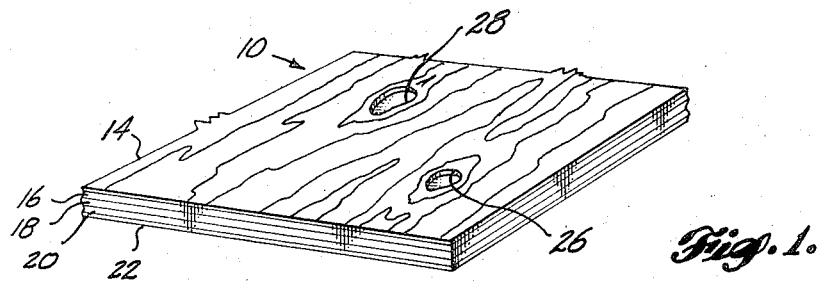
FIG. 1 is a perspective view of a portion of a plywood panel, with knot hole regions therein repaired as contemplated by the invention.
Figure 2:
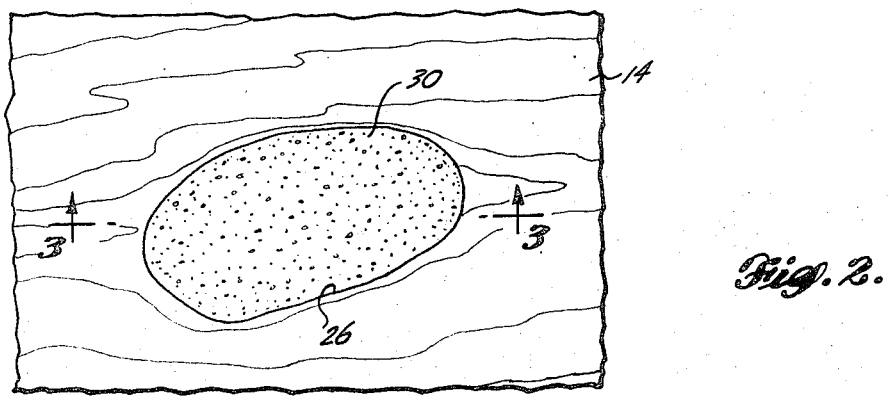
FIG. 2 is an enlarged view of portions of the face of the panel shown in FIG. 1.

The process of this invention is applicable to the repair of a number of different wooden articles. For instance, it can be utilized in the repair of face veneers in plywood panels, to prepare a face which may be stained or painted. The process may also be used in the repair of so-called mill work products, such as molding, window parts, stiles and rails of door frames, etc., to fill routed out defective regions in the wood and as an alternative to cutting out sections containing the defects in the lumber followed by end joining of the pieces remaining after removal of the defective section. Mill work articles, such as molding, etc., ordinarily are made from lumber repaired with respect to defects before passing the lumber through the mill working machinery. The fact that the process of the invention enables the production of filled regions having excellent machinability characteristics, renders the invention particularly significant in mill work operations.

Considering initially the process of the invention in connection with the repair of an article such as a plywood panel, in the drawings portions of a plywood panel are shown at 10. The panel comprises multiple veneer layers indicated at 14, 16, 18, 20, and 22, laid one on top of the other and glued together in face-to-face contact. Veneer layers 14, 22 form opposite faces of the panel, and these sometimes may be referred to as a face and a back, respectively. The remainder of the veneer layers are usually referred to as the cores in the panel. The usual glue lines unite or join together the veneer layers in the panel.

The face and back veneer layers in such panel may have defects therein such as knots. In the case of the face veneer, for esthetic reasons and to increase the soundness of the surface of the panel, these may be removed and the hole left filled with a filler. The filler on hardening forms a filler plug lodged within the outlines of the original knothole, with the face of said plug forming a continuation of the surface of the face veneer layer in the panel. Frequently, and considering a defect such as a knot, it is the practice to remove the knot prior to laying up of the panel. This leaves open knotholes produced by the removal, the outlines of such knotholes in the face veneer layer 14 being indicated at 26 and 28.

In repairing the face of the panel, the filler composition of the invention may be introduced directly into the knothole with such overlying and bonding to the glue line 32 which unites face veneer layer 14 to the core 16 where such extends under the knothole. However, a better seal of the region repaired, and a better bond with the underlying core is produced, if a cavity is prepared in the glue line coextensive with the knothole by first routing out the glue line. With this procedure, when the filler composition is introduced into the region of repair, the resin of the composition penetrates to a degree the now exposed wood of the core to become securely adhesively bonded to the core.

In repairing plywood panels, other defects than knots, for instance, may be repaired such as regions of decayed wood, etc. In this instance, the region to be repaired may be cleared of defective material as by routing to produce a hole or aperture in the face veneer layer for the reception of filler composition. In this type of repair, not infrequently the routing is performed after laying up of the various veneers of a plywood panel.

A filler composition for filling the region of repair may be produced by mixing together a thermosetting resin binder and comminuted or ground cork.

In a preferred composition, the comminuted cork comprises from 3 to 10 percent by weight of the mixture, with the remainder being essentially thermosetting resin. The density of the usual Mediterranean cork is such that the inclusion of 6 percent by weight of cork in a resin cork mixture produces a mixture having a volume which is approximately 22 percent greater than the volume of the resin before the cork addition. Cork is a relatively light material, and with a percentage of cork much exceeding the upper limit indicated, the amount of cork on a volume basis becomes so great as to impair the flowability of the composition. The use of lesser amounts of cork than that indicated increases, of course, the expense of the filler composition, and produces diminishment of the beneficial characteristics which flow from the use of the cork addition.

Variations in the particle size of the comminuted cork used in the filler composition effect to some extent the appearance of the repaired region finally obtained. For instance, with larger cork particle sizes, a somewhat more mottled effect is obtained in the repaired region, whereas with finer cork particle sizes, a more homogeneous color effect is obtained with less color variation. Cork particle size will also have some effect on the flowability of the fluid composition. Smaller cork particles, after initial mixing, tend to become more an intimate part of the flowing mixture than is the case with larger particles. To obtain optimum flowability, we have found it preferable to use cork having a particle size which passes through a 20 mesh screen (Tyler). For a mottling effect, particles that are retained on a 40 mesh screen are indicated. For a more homogeneous color effect particles, passing through a 50 mesh and retained on an 80 mesh screen are indicated.

As a binder in the filler composition, it is contemplated that a thermosetting resin be utilized. Such resin on curing or setting adhesively bonds the filler plug produced within the repaired region, and further functions to unite the various cork particles together. Exemplary of the various thermosetting resins which are employable using the process of the invention are the so-called polyester resins, which commonly are styrene type polyesters, the so-called epoxy resins (epichlorohydrin bisphenol), and the so-called polyurethane resins. To obtain suitable flowability in the filler composition, at usual plant operating conditions, such resins preferably should have a viscosity within a range of about 400 to 1,000 centipoise (cps.) at 77° F. The viscosity of the mix, as finally used and under usual prevailing operating conditions, preferably should not exceed about 1,500 cps. Typifying the polyester resins that may be utilized are the IC resins of Interchemical Corporation, the MR resins of Celanese Corporation of America, and the Polylite Resins of Reichhold Chemicals Inc.

The following examples are included to illustrate the invention in connection with the repair of plywood panels.

A mixture was prepared of 100 parts polyester resin (Polylite 32–773 of Reichhold Chemicals, Inc.), six parts comminuted Mediterranean cork having a particle size passing through a 20 mesh screen but retained on a 40 mesh screen, and a catalyst in the form of 1.5 parts of methyl ethyl ketone containing 3 percent peroxide.

The resin utilized had a viscosity at 77° F. within the range of 600 to 800 cps. and a specific gravity of about 1.1. The filler composition made from the resin and cork mixture had approximately the flowability of honey, enabling it to flow easily into a hole to effect a repair thereof.

The filler composition was utilized to fill knotholes in a plywood siding panel faced with cedar veneer approximately 1/16 inch in thickness. Prior to filling knothole regions in such veneer, the glue line exposed by the open knotholes was routed out with conventional equipment. Fills were made by squeezing the filler composition from a squeeze bottle into the knothole regions. After being introduced to the knotholes, the composition quickly flowed outwardly to fill the peripheral boundaries of the knotholes. The mixture had a gel time of approximately 20 minutes, yielding after such period a hardened filler plug for the holes repaired.

Exterior cedar siding panels of the type mentioned were worked over their surfaces by sanding them, and by wire brushing them, to give the panels a textured appearance. In each instance, the finished panel so produced had filled knothole regions which approximated in texture the texture of surrounding wood regions in the panel. In the case of the wire brushed panels, the knothole fills had a rough appearance without sheen, and in the case of the sanded panels, the regions had a smooth sanded appearance without sheen.

Figure 3:
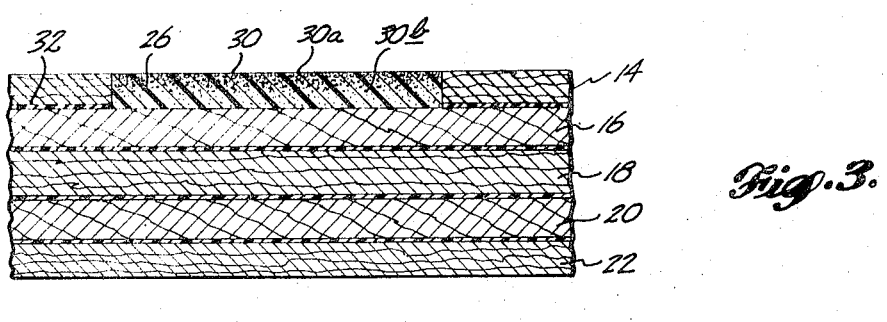
FIG. 3 is a cross-sectional view, taken generally along the line 3—3 in FIG. 2.

When panels with knothole regions so prepared were inspected, after cutting them through a filled region, it was noted that the filler composition on curing stratified, with the production of a layer as exemplified in FIG. 3 shown at 30a adjacent the outer surface of the veneer which was predominantly cork and an underlying layer indicated generally at 30b bonded to the wood at the base of the prepared regions containing significantly lesser cork. The resin, therefore, produced a good seal with the underlying wood in the repaired region, the cork particles, in a manner of speaking, having floated to the top of the filled region prior to hardening of the filler. The appearance of the filled region from the surface of the panel was one distinctly of cork. In the mixture, each cork particle had become covered with the resin in making the filler, and this covering resin was sufficient to unite the cork particles firmly in the outer layer.

With cork being a closed-cell material, in the final filler plug which was prepared it was noted that substantially no absorption of the resin binder into the cork particles had taken place. With hardening of the filler composition and on sanding of the resultant plug produced, the individual cork particles were abraded away to leave at the surface of the panel a region of cork texture rather than one of resin consistency. It is felt that this feature of the invention contributed to the lack of sheen which resulted when repairs were made as contemplated.

In other examples, filler compositions were made by employing a thermosetting resin binder such as an epoxy resin. The amount of comminuted cork present in the composition was varied within the range indicated above, with the obtaining of highly satisfactory results when such compositions were employed in the repairing of panels.

As noted, the filler compositions were flowable, permitting their application using squeeze bottles or other types of applicators. This rendered the filler compositions readily introducible into variously shaped cavities or apertures, or other regions of repair, without the difficulties that result when pastetype fillers are employed.

The process of the invention is also usable in the repair of wooden articles such as boards, to prepare them for processing in a molding machine or other type of mill work machinery. Specifically illustrating this particular use of the process, the defective areas in pine boards were repaired through the steps of first routing out the defective regions utilizing conventional routing equipment. A filler composition was prepared comprising 200 parts polyester resin (Polylite resin 99–103 of Reichhold Chemicals, Inc.), 2 ½ parts promoter, 2 ½ parts catalyst, eight parts Mediterranean cork particles (passing through a 50 mesh but retained on an 80 mesh Tyler screen), and pigment (seven parts titanium oxide and two parts chrome yellow). Additionally included in the mixture was a small percentage of antifoaming compound, i.e., one-half parts dimethyl polysiloxane, The filler composition so prepared had a liquid flowable consistency. The filler composition was introduced into the apertures prepared in the pine boards through the routing operation above described. The apertures were slightly overfilled with filler composition. With introduction of the filler composition, because of its liquid consistency, it rapidly flowed outwardly to fill the peripheral boundaries of the apertures filled.

The filler composition after approximately a 20 minute period cured to form filler plugs firmly bonded within the apertures in the wood. By reason of the inclusion of the pigment mentioned, the filler plugs had approximately the overall color of the pine boards repaired.

The boards so prepared were then passed through a molding machine with rotating cutters in the machine profiling the boards to produce elongated molding strips. The plugs prepared were machined along with the wood. Where the profiling extended through a plug, such exposed a surface of cork smoothly meeting with wood regions surrounding the plug area.

Molding strips so prepared may be coated with the usual finishing materials such as paint or varnishes. With a paint applied, the buildup of the paint on the surface whether it be a repaired region or the wood surrounding it, was essentially the same, so that with minimal coats a uniform coated appearance was obtained with no evidence of the repair.

Summarizing some of the advantages of the instant invention, filler plugs may be prepared to fill the openings or apertures prepared in a wooden article to remove defective areas, possessing excellent machinability closing matching the machinability of the wood. The filler plugs produced, like wood, are stainable and also readily accept a paint coating. Reflectance and other characteristics match those of natural wood. If desired, pigments may be included in the composition to impart to the filler plugs the general color tone of a particular wood, rendering it more easy to cover the patch with a paint or other coating. Additionally, it has been noted that the inclusion of the cork eliminates such things as star checking, as a result of excessive shrinking occurring in the plug during the curing process.

While the above examples described certain preferred filler compositions and methods for using the filler in the repair of plywood panels and other wooden products it should be apparent that changes and modifications may be made without departing from the spirit of the invention.

It is claimed and desired to secure by Letters Patent:

1. A method of manufacturing a repaired plywood panel comprising
   preparing a hole in the outer veneer of a panel in the region of the repair,
   filling said hole with a liquid filler composition comprising from 3 to 10 percent by weight comminuted cork, and
   permitting said filler composition to harden within said hole, with such accompanied with stratification resulting in the cork rising to form a layer adjacent the outer surface of the veneer having a substantially greater amount of cork than an underlying layer at the bottom of the hole, to produce a filled repaired region.

2. A method of repairing a wooden article having an aperture therein comprising
   introducing into said aperture a filler composition having a flowable liquid consistency which filler composition is a mixture of Mediterranean cork particles and thermosetting resin,
   with flowing of said filler composition filling the peripheral boundaries of said aperture, and
   permitting said filler composition to harden within said aperture with such accompanied with stratification resulting in the cork rising to form a layer adjacent the outer surface of the article having a substantially greater amount of cork than an underlying layer at the bottom of the aperture, to produce a filled repaired region.

3. A method of repairing a wooden article having an aperture therein which aperture opens to a surface of the article, the method comprising
   introducing into said aperture a filler composition having a flowable liquid consistency, which filler composition is a mixture of Mediterranean cork particles and thermosetting resin,
   permitting said composition through gravity to flow so as to fill the peripheral boundaries of the aperture, and then letting the composition harden to form a hardened filler plug of cork material encased in resin, and
   removing material from the article where it surrounds said plug and from said plug to produce a surface extending across the plug with exposed cork particles in the region of said plug.

4. The method of claim 3, wherein said article is a plywood panel including an outer veneer and a core with a glue line uniting the outer veneer to the core, said aperture is in the outer veneer and extends through said glue line to expose the wood of the core, and said filler composition on being introduced into said aperture flows over the wood of said core and on hardening bonds to the core.

5. A method of repairing a wooden article having an aperture therein opening to a surface of the article comprising introducing into said aperture a filler composition having a flowable liquid consistency, which filler composition is a mixture of Mediterranean cork particles and thermosetting resin with the particles comprising from about 3 to 10 percent by weight cork particles, permitting said composition through gravity to flow so as to fill the peripheral boundaries of said aperture, and subsequently letting the composition harden to form a hardened filler plug of cork particles encased in resin, said hardening occurring after stratification of the cork particles which results by reason of their tendency to rise to the surface of the filler composition on the composition initially being introduced to said aperture, and removing material from the article where it surrounds said plug and the plug to produce a surface extending across the plug with exposed cork particles.

* * * * *